(12) United States Patent
Kim et al.

(10) Patent No.: US 7,224,506 B2
(45) Date of Patent: May 29, 2007

(54) SINGLE SIDE BAND MODULATION DEVICE

(75) Inventors: Sung-Kee Kim, Suwon-si (KR); Hoon Kim, Suwon-si (KR); Han-Lim Lee, Seoul (KR); Seong-Taek Hwang, Pyeongtaek-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 49 days.

(21) Appl. No.: 11/360,076

(22) Filed: Feb. 23, 2006

(65) Prior Publication Data
US 2007/0024949 A1 Feb. 1, 2007

(30) Foreign Application Priority Data
Aug. 1, 2005 (KR) ............ 10-2005-0070405

(51) Int. Cl.
*G02F 1/01* (2006.01)
(52) U.S. Cl. .............. 359/276; 359/278; 359/279; 359/280; 359/281; 385/1; 385/2; 385/3; 398/188
(58) Field of Classification Search ........... 398/188, 398/183, 102, 185; 385/40, 45, 14, 140; 359/237, 245, 246, 254, 276, 135; 333/156
See application file for complete search history.

(56) References Cited

U.S. PATENT DOCUMENTS

| | | | |
|---|---|---|---|
| 6,650,458 B1 * | 11/2003 | Prosyk et al. .......... | 359/276 |
| 6,900,707 B2 * | 5/2005 | Erlig et al. .......... | 333/156 |
| 7,010,230 B2 * | 3/2006 | Lee et al. .......... | 398/102 |
| 7,027,742 B2 * | 4/2006 | Tanaka et al. .......... | 398/185 |
| 2002/0191886 A1 * | 12/2002 | Castoldi et al. .......... | 385/14 |
| 2003/0095311 A1 * | 5/2003 | Liu et al. .......... | 359/135 |
| 2004/0081470 A1 * | 4/2004 | Griffin .......... | 398/188 |
| 2005/0207721 A1 * | 9/2005 | Aoki et al. .......... | 385/140 |
| 2005/0220385 A1 * | 10/2005 | Kawanishi et al. .......... | 385/1 |

OTHER PUBLICATIONS

Oikawa et al., "Single Side Band Modulation Performance of a LiNbO3 integrated Modulator Consisting of Four Phase Modulator Waveguides", Apr. 2001, IEEE Photonics Technology Letters, vol. 13, No. 4, pp. 364-366.*

* cited by examiner

*Primary Examiner*—Frank G. Font
*Assistant Examiner*—Guy G. Anderson
(74) *Attorney, Agent, or Firm*—Cha & Reiter, L.L.C.

(57) ABSTRACT

A single side band modulation device includes a first Mach Zehnder interferometer and a second Mach Zehnder interferometer. The first Mach Zehnder interferometer includes at least two output arms, and the second Mach Zehnder interferometer includes at least two output arms. Terminals of the output arms are connected with one another.

20 Claims, 9 Drawing Sheets

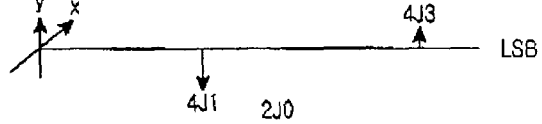

SINGLE SIDE BAND MODULATION DEVICE

CLAIM OF PRIORITY

This application claims priority under 35 U.S.C. § 119 to an application entitled "Single Side Band Modulation Device," filed in the Korean Intellectual Property Office on Aug. 1, 2005 and assigned Serial No. 2005-70405, the contents of which are incorporated herein by reference.

BACKGROUND

1. Field of the Invention

The present invention generally relates to a single side band modulation device for single side band transmission, and in particular, to a single side band modulation device capable of simultaneously transmitting carrier channels.

2. Description of the Related Art

The spectrum of a modulated signal obtained by modulating amplitude-modulated data to a carrier forms an upper side band and a lower side band with respect to a carrier frequency serving as an axis of symmetry. For transmission of the modulated signal, single side band transmission is used where the carrier and one of those side bands are removed and only the other one is used.

The upper side band is a high frequency band to which the channels of the modulated signal are shifted and the lower side band is a low frequency band to which the inverted channels of the modulated signal are shifted.

Single side band transmission requires a bandwidth that is one half that of double side band transmission. By not transmitting a carrier and a side band, amplifier power consumption is minimized. In addition, single side band transmission reduces noise due to its narrow bandwidth, thereby improving a signal-to-noise ratio and reception sensibility. A single side band modulation device for single side band transmission filters in an optical domain using an optical fiber Bragg grating. However, the single side band modulation device is not suitable for actual use due to the difficulty in manufacturing the optical fiber Bragg grating and its poor stability. To solve the problem of the existing single side band modulation device, a LiNbO3-based single side band modulation device having superior stability is suggested.

FIG. 1 illustrates a conventional single side band modulation device 100 for single side band transmission. Referring to FIG. 1, the single side band modulation device 100 includes a single side band modulation module 120, a hybrid coupler 130, and a light source 110. The light source 110 generates carriers. The hybrid coupler 130 processes input data into a first signal having a phase of 0° and a second signal having a phase of 90° and outputs the first signal and the second signal to the single side band modulation device 120.

FIG. 2 illustrates the single side band modulation module 120 illustrated in FIG. 1. Referring to FIG. 2, the single side band modulation module 120 includes first through fifth phase modulators 121a, 121b, 122a, 122b, and 123. The first phase modulator 121a and the second phase modulator 121b constitute a first Mach Zehnder interferometer 121, and the third phase modulator 122a and the fourth phase modulator 122b constitute a second Mach Zehnder interferometer 122. The first signal and the second signal are input to each of the first Mach Zehnder interferometer 121 and the second Mach Zehnder interferometer 122 from the hybrid coupler 130 in a push-pull manner.

The first Mach Zehnder interferometer 121 generates a third signal by mixing the first signal and the second signal that are push-pull input from the hybrid coupler 130 and the second Mach Zehnder interferometer 122 generates a fourth signal by mixing the first signal and the second signal. The first through fourth signals have phase differences of 0 and $\pi$ by bias voltages applied to the first through fifth phase modulators 121a, 121b, 122a, 122b, and 123. In particular, the phase of the third signal is $+\pi/2$ or $-\pi/12$ shifted by the fifth phase modulator 123.

FIGS. 3A through 3G are graphs illustrating changes in the phases of the first signal and the second signal in the single side band modulation module 120. The graphs show changes in the arrangement of a Bessel function with respect to the changes in the phases of the first signal and the second signal in each component of the single side band modulation module 120 when $\cos(\omega t)$ is input to the hybrid coupler 130. J in graphs (a) through (g), i.e., FIGS. 3A to 3G, indicates a first kind Bessel function. Subscripts 0, 1, 2, 3 of J indicate the orders of the Bessel function. In other words, $J_0(x)$ is a first kind zero-order Bessel function, $J_1(x)$ is a first kind first-order Bessel function, $J_2(x)$ is a first kind second-order Bessel function, and $J_3(x)$ is a first kind third-order Bessel function.

The independent variable x is determined by a voltage applied to the single side band modulation module 120 and an inherent switching voltage of the single side band modulation module 120 (a voltage that should be applied for 180° phase shift). As the order of a first kind Bessel function increases with respect to the same factor x, the magnitude of the first kind Bessel function decreases. Thus, first kind Bessel functions whose orders are greater than 3 will be omitted. In FIG. 3, the size of an arrow indicates the magnitude of the first kind Bessel function and the direction of an arrow indicates a phase. In other words, when the Y-axis direction is assumed to be a phase of 0, the X-axis direction indicates a phase of $\pi/2$, the -Y-axis direction indicates a phase of $\pi$, and the -X-axis direction indicates a phase of $3\pi/2$. The Z-axis indicates a frequency. With respect to the $J_0$ carrier frequency, the frequency $\pm\omega$ is applied to result in $J_1$, the frequency $\pm 2\omega$ (which is 2 times the applied frequency) is used to result in $J_2$, and a frequency $\pm 3\omega$ (which is 3 times the applied frequency) is used to result in $J_3$.

The graphs (a) and (b) respectively show the waveforms of the first signal and the second signal that are push-pull input to the first Mach Zehnder interferometer 121, the graphs (c) and (d) respectively show the waveforms of the first and second signals that are push-pull input to the second Mach Zehnder interferometer 122, and the graph (e) shows the waveform of the third signal obtained by mixing the first signal and the second signal to the first Mach Zehnder interferometer 121. The third signal is mixed with the waveform of the fourth signal shown in the graph (f) after being $\pm\pi/2$ phase-modulated by the fifth phase modulator 123.

When the third signal is $+\pi/2$ phase-modulated, it is mixed with the fourth signal to form an upper side band (USB) signal. When the third signal is $-\pi/2$ phase-modulated, it is mixed with the fourth signal to form a lower side band (LSB) signal. The resulting USB and LSB signals are represented in graph (g).

However, it can be seen from the graph (g) that a carrier frequency is removed from both the upper side band signal and the lower side band signal. Referring to FIGS. 4A, 4B, 4C, 4D showing changes in eye-diagrams with respect to the magnitude of a carrier frequency, it can be seen that the graph in FIG. 4A showing an eye-diagram with respect to a carrier frequency of the smallest magnitude is smallest and the graph in FIG. 4D showing an eye-diagram with respect to a carrier frequency of the largest magnitude is largest and represented clearly.

Modulation of a single side band from which a carrier frequency is removed cannot use a receiver of a direction detection type, but should use a complicated detector of an optical interferometer type instead.

To solve the problem, an offset may be applied to a conventional single side band modulation device. However, in this case, an unwanted other side band may be mixed. In other words, a lower side band signal may be mixed during transmission of an upper side band signal or the upper side band signal may be mixed during transmission of the lower side band signal.

SUMMARY OF THE INVENTION

It is, therefore, an object of the present invention to provide a single side band modulation device capable of transmitting a single side band signal including a carrier frequency.

According to one aspect of the present invention, there is provided a single side band modulation device for modulating a first signal and a second signal into an upper side band signal, or a lower side band signal, for output as a modulated signal. The single side band modulation device includes a first Mach Zehnder interferometer, a second Mach Zehnder interferometer, a first port, and a second port. The first Mach Zehnder interferometer outputs to a first output arm a third signal obtained by mixing the first signal and the second signal, and outputs to a second output arm a fourth signal obtained by phase-shifting one of the first signal and the second signals and mixing the phase-shifted signal with the other of the first and second signals. The second Mach Zehnder interferometer outputs a fifth signal obtained by mixing the first signal and the second signal to a third output arm and outputs to a fourth output arm a sixth signal obtained by phase-shifting one of the first signal and the second signals and mixing the phase-shifted signal with the other of the first and second signals. The first port is connected with the first output arm and the third output arm. The second port extends from the first port and is connected with the second output arm and the fourth output arm.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION

In the following description, a detailed description of known functions and configurations incorporated herein is omitted for clarity of presentation.

Figure 1:
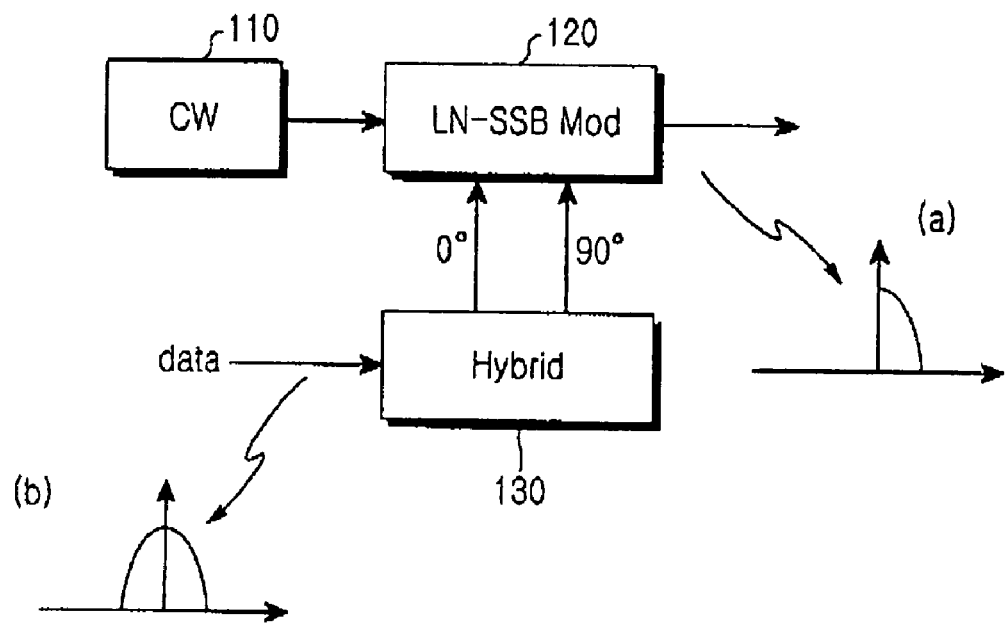
FIG. 1 illustrates a conventional single side band modulation device.
Figure 2:
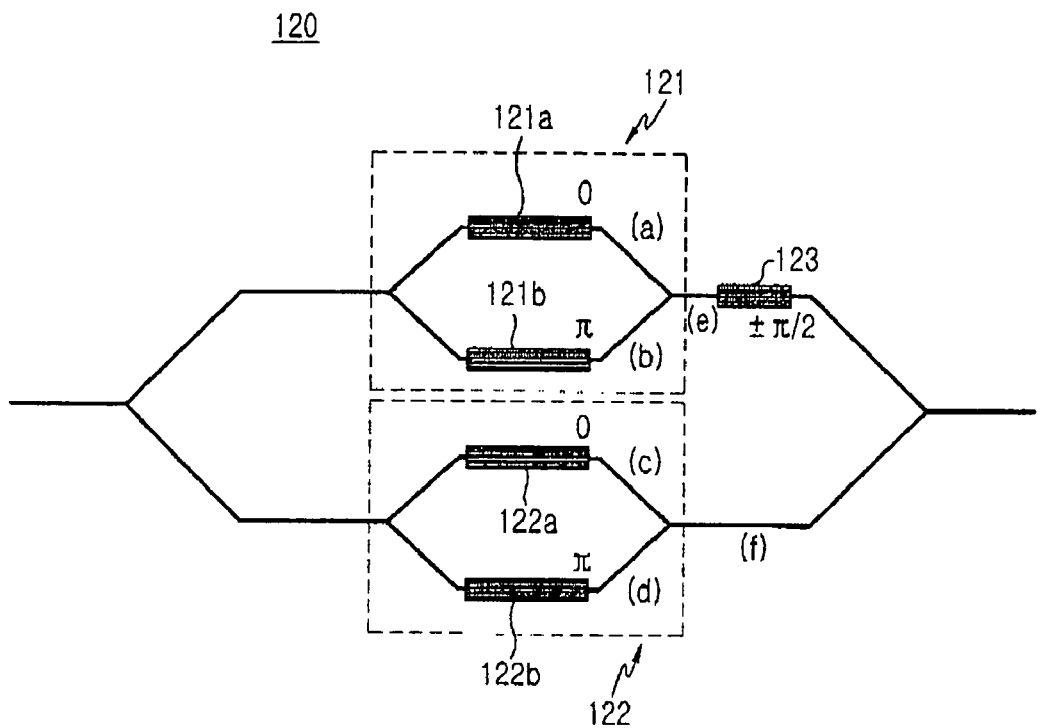
FIG. 2 illustrates the single side band modulation module illustrated in FIG. 1.
Figure 3A:
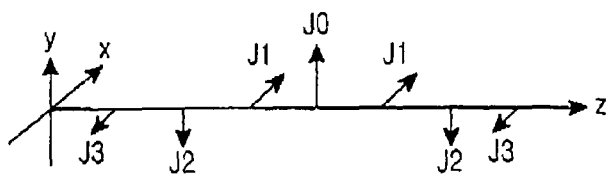
FIGS. 3A through 3G are graphs for explaining signal waveforms in each component of the single side band modulation module illustrated in FIG. 2.
Figure 3B:
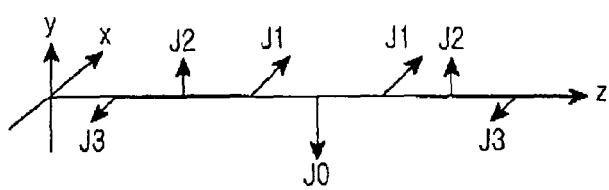
Figure 3C:
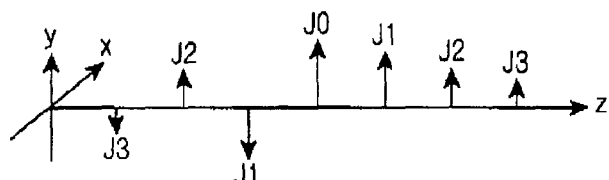
Figure 3D:
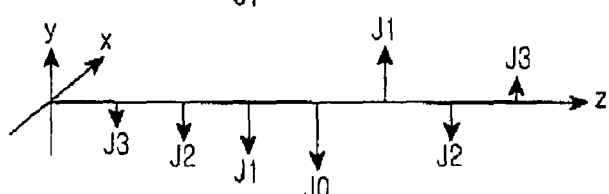
Figure 3E:
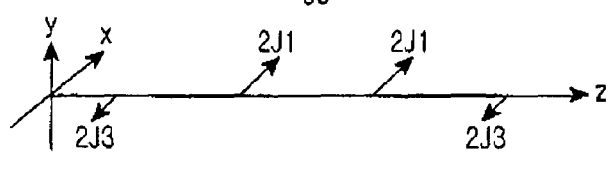
Figure 3F:
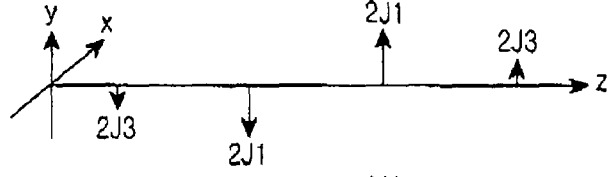
Figure 3G:
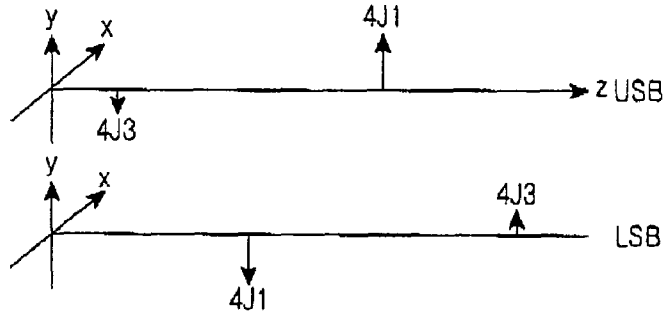
Figure 4A:
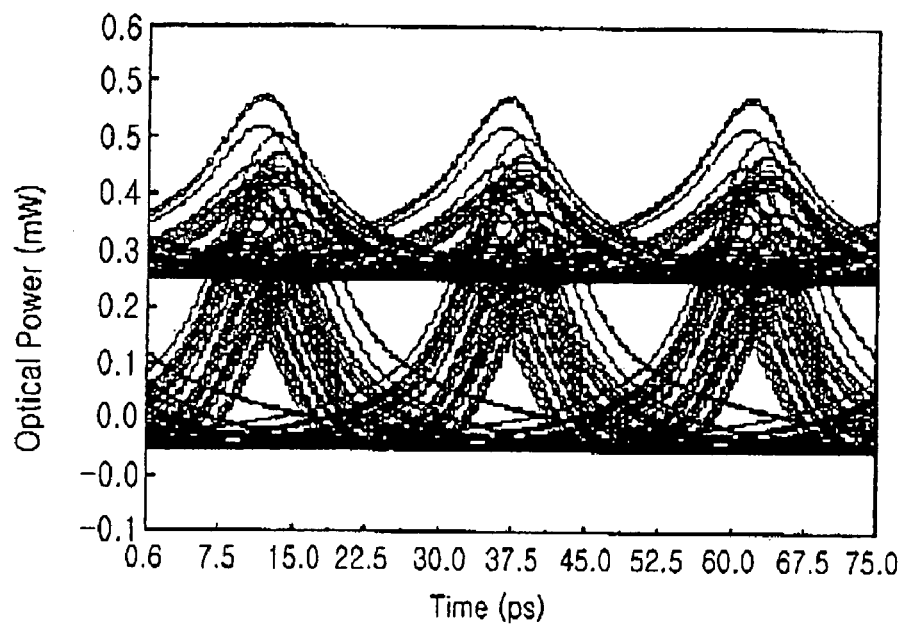
FIGS. 4A through 4D are graphs showing eye-diagrams with respect to the magnitude of a carrier frequency.
Figure 4B:
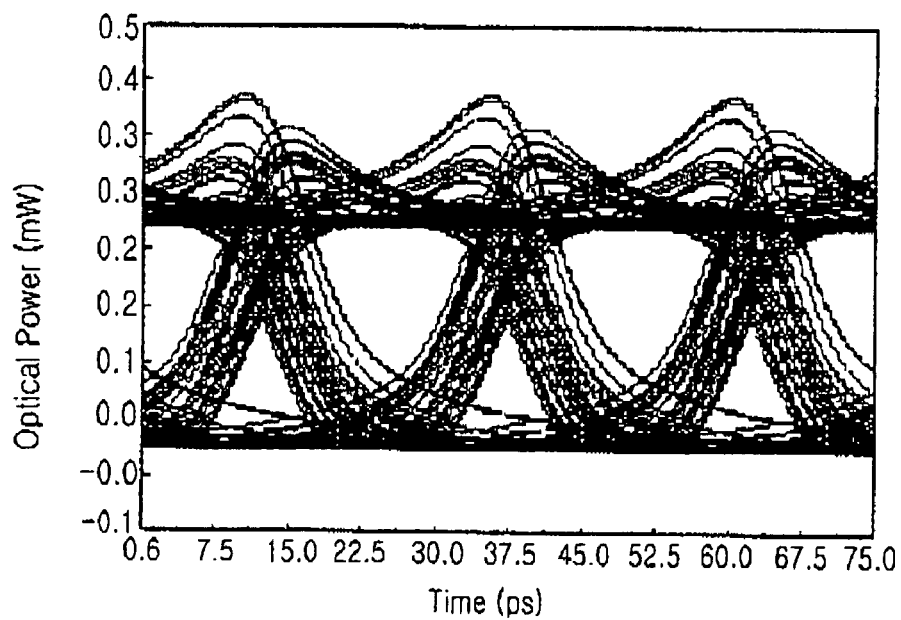
Figure 4C:
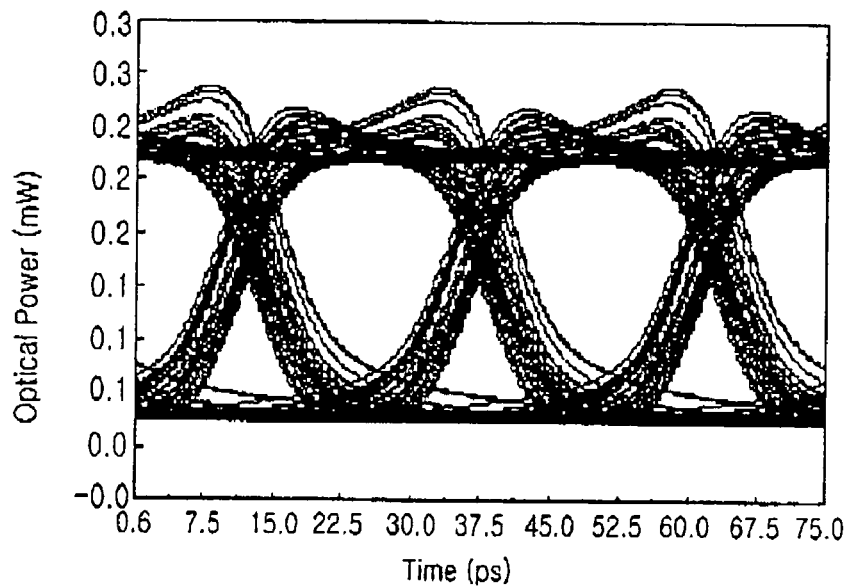
Figure 4D:
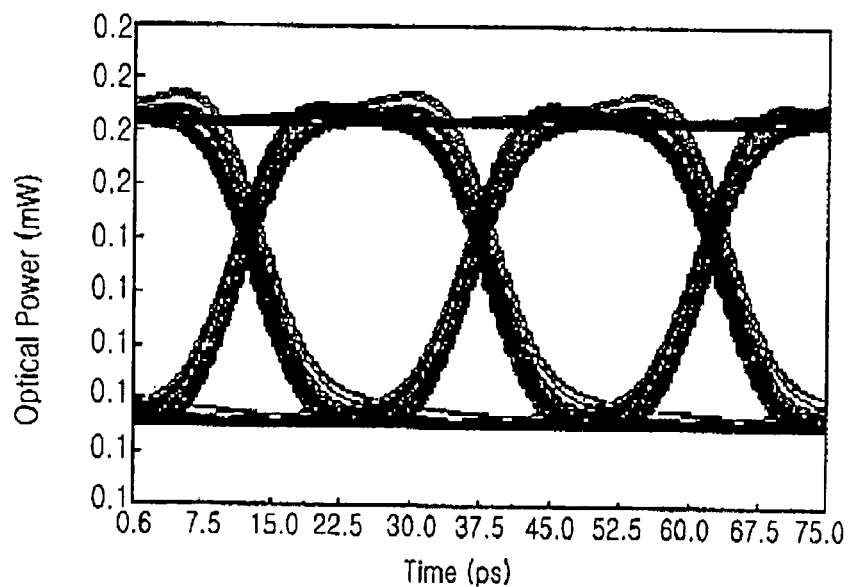
Figure 5:
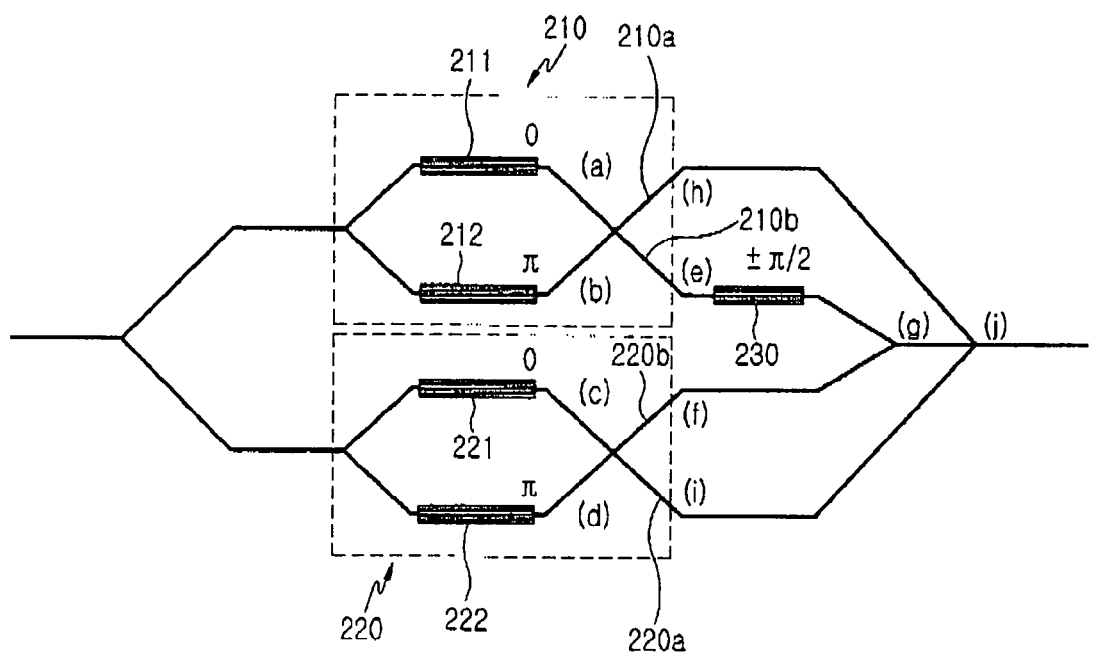
FIG. 5 illustrates a single side band modulation device according to a first embodiment of the present invention.
Figure 6A:
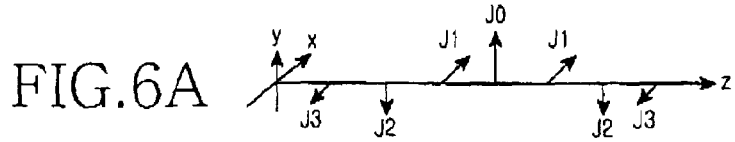
FIGS. 6A through 6J are graphs for explaining signal waveforms in each component of the single side band modulation device illustrated in FIG. 5.
Figure 6B:
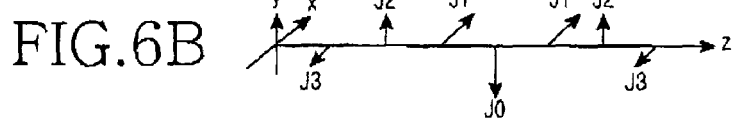
Figure 6C:
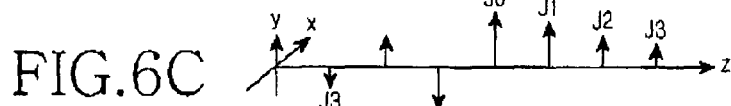
Figure 6D:
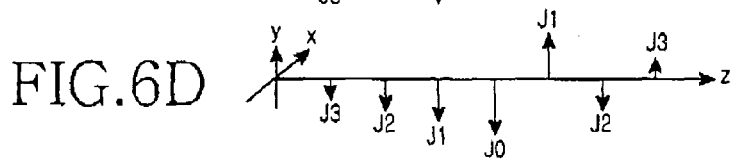
Figure 6E:
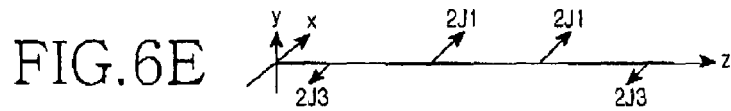
Figure 6F:
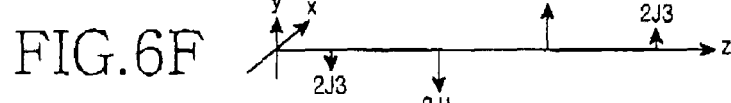
Figure 6G:
Figure 6H:
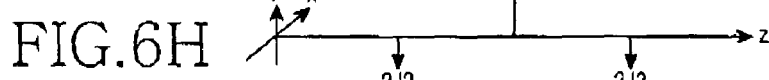
Figure 6I:
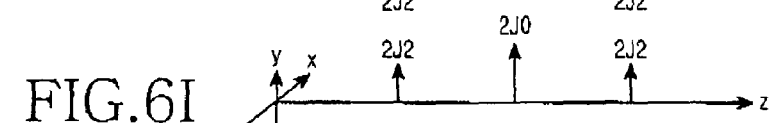
Figure 6J:
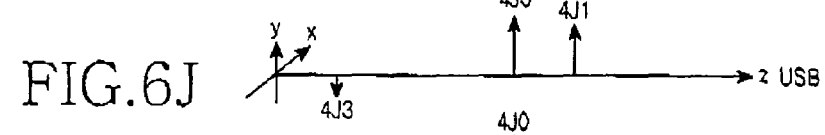

FIG. 5 illustrates a single side band modulation device 200 according to a first embodiment of the present invention. It obtains a first signal and a second signal, as from the hybrid coupler 130, and modulates the signals into an upper single side band (USB) signal or a lower single side band (LSB) signal. The modulation device 200 includes a first Mach Zehnder interferometer 210 having a first output arm 210b and a second output arm 210a, a second Mach Zehnder interferometer 220 having a third output arm 220b and a fourth output arm 220a, a first port g connected with the first output arm 210b and the third output arm 220b, and a second port j extending from the first port g and connected with the second output arm 210a and the fourth output arm 220a.

The first Mach Zehnder interferometer 210 outputs on the first output arm 210b a third signal obtained by mixing the first signal and the second signal, and outputs to the second output arm 210a, a fourth signal, obtained by phase-shifting one of the first signal and the second signals and mixing the phase-shifted signal with the other of the first and second signals.

The second Mach Zehnder interferometer 220 outputs on the third output arm 220b a fifth signal obtained by mixing the first signal and the second signal, and outputs on the fourth arm 220a a sixth signal, obtained by phase-shifting one of the first signal and the second signal and mixing the phase-shifted signal with the other of the first and second signals.

The single side band modulation device 200 includes a plurality of phase modulators 211, 212, 221, 222 for modulating the phases of the first signal and the second signal to cause the first signal and the second signal which are push-pull input to the first Mach Zehnder interferometer 210 and the second Mach Zehnder interferometer 220 to have a phase difference of π. The modulation device 200 further includes a phase modulator 230 positioned on the first output arm 210b to modulate the phase of the third signal by π/2 or −π/2.

FIGS. 6A through 6J are graphs (a) through (j) for explaining signal waveforms in each component of the single side band modulation device 200 illustrated in FIG. 5. Graph (a) shows the first signal that is push-pull input to the first Mach Zehnder interferometer 210. Graph (b) shows the second signal input to the first Mach Zehnder interferometer 210. Graph (c) shows the first signal input to the second Mach Zehnder interferometer 220. Graph (d) shows the second signal input to the second Mach Zehnder interferometer 220. The phase of the first signal can be expressed as $\cos(\omega mt)$ and the phase of the second signal can be expressed as $\cos(\omega mt+\pi)$.

The first signal and the second signal input to the first Mach Zehnder interferometer 210 are mixed to obtain the third signal having a Bessel function shape as shown in graph (e) of FIG. 6. One of the first signal and the second signals is phase-shifted and the phase-shifted signal is mixed with the other of the first and second signals to obtain the fourth signal, which has a Bessel function shape as shown in graph (h) of FIG. 6.

The first signal and the second signal input to the second Mach Zehnder interferometer 220 are mixed as the fifth signal having a Bessel function shape as shown in graph (f) of FIG. 6. One of the first signal and the second signal is phase-shifted and the phase-shifted signal is mixed with the other of the first and second signals to obtain the sixth signal, which has a Bessel function shape as shown in graph (i) of FIG. 6. However, the third signal is $\pi/2$ or $-\pi/2$ phase-shifted by the phase modulator 230 and then outputted once more onto the first output arm 210b.

The third signal and the fifth signal output, respectively, to the first output arm 210b and the third output arm 220b are mixed as a USB signal or an LSB signal at the first port g according to the $\pi/2$ or $-\pi/2$ phase shift applied to the third signal. The resulting USB and LSB signals are represented in graph (g).

The USB and LSB signals mixed at the first port (g) do not include a carrier frequency. Each of the two signals is mixed with the fourth signal output to the second output arm 210a or the sixth signal output to the fourth output arm 220a. Thus, an upper side band signal or a lower side band signal as shown in graph (j) of FIG. 6 is obtained at the second port j.

In the graphs (a) through (j) of FIG. 6, J indicates a first kind Bessel function. Subscripts 0, 1, 2, 3 of J indicate the orders of a Bessel function. In other words, $J_0(x)$ is a first kind zero-order Bessel function, $J_1(x)$ is a first kind first-order Bessel function, $J_2(x)$ is a first kind second-order Bessel function, and $J_3(x)$ is a first kind third-order Bessel function.

The independent variable x is determined by a voltage applied to the single side band modulation device 200 and an inherent switching voltage of the single side band modulation module 200 (a voltage that should be applied for 180° phase shift). As the order of a first kind Bessel function increases with respect to the same factor x, the magnitude of the first kind Bessel function decreases. Thus, first kind Bessel functions whose orders are greater than 3 will be omitted. In FIG. 6, the size of an arrow indicates the magnitude of a first kind Bessel function and the direction of an arrow indicates a phase. In other words, when the Y-axis direction is assumed to be a phase of 0, the X-axis direction indicates a phase of $\pi/2$, the $-$Y-axis direction indicates a phase of $\pi$, and the $-$X-axis direction indicates a phase of $3\pi/2$. The Z-axis indicates a frequency. With respect to the $J_0$ carrier frequency, the frequency $\pm\omega$ is applied to result in $J_1$, the frequency $\pm 2\omega$ (which is 2 times the applied frequency) is used to result in $J_2$, and a frequency $\pm 3\omega$ (which is 3 times the applied frequency) is used to result in $J_3$.

Figure 7:
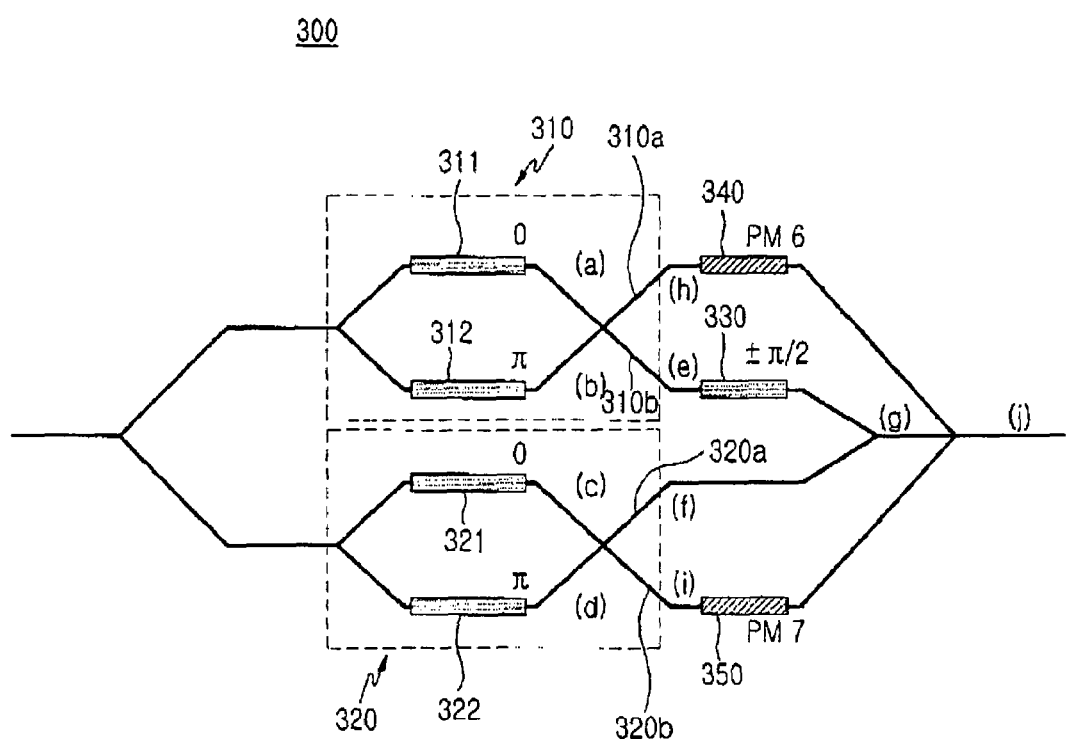
FIG. 7 illustrates a single side band modulation device according to a second embodiment of the present invention.

FIG. 7 illustrates a single side band modulation device 300 according to a second embodiment of the present invention. The modulation device 300 includes a first Mach Zehnder interferometer 310 having a first output arm 310b and a second output arm 310a, a second Mach Zehnder interferometer 320 having a third output arm 320a and a fourth output arm 320b, a first port g connected with the first output arm 310b and the third output arm 320a, and a second port j extending from the first port g and connected with the second output arm 310a and the fourth output arm 320b.

The first Mach Zehnder interferometer 310 outputs to the first output arm 310b the third signal obtained by mixing the first signal and the second signal, and outputs to the second output arm 310a the fourth signal, obtained by phase-shifting one of the first signal and the second signals and mixing the phase-shifted signal with the other of the first and second signals.

The second Mach Zehnder interferometer 320 outputs to the third output arm 320a the fifth signal obtained by mixing the first signal and the second signal, and outputs to the fourth output arm 320b the sixth signal, obtained by phase-shifting one of the first signal and the second signals and mixing the phase-shifted signal with the other of the first and second signals.

To minimize a phase difference between the fourth signal and the sixth signal mixed at the second port j, the single side band modulation device 300 may further include phase modulators 340, 350 respectively positioned on the second output arm 310a and the fourth output arm 320b, or merely one of the phase modulators 340, 350 so positioned on its respective output arm. The modulation device 300 preferably further includes a phase modulator 330 positioned on the first output arm 310b to modulate the phase of the third signal by $\pi/2$ or $-\pi/2$.

Figure 8:
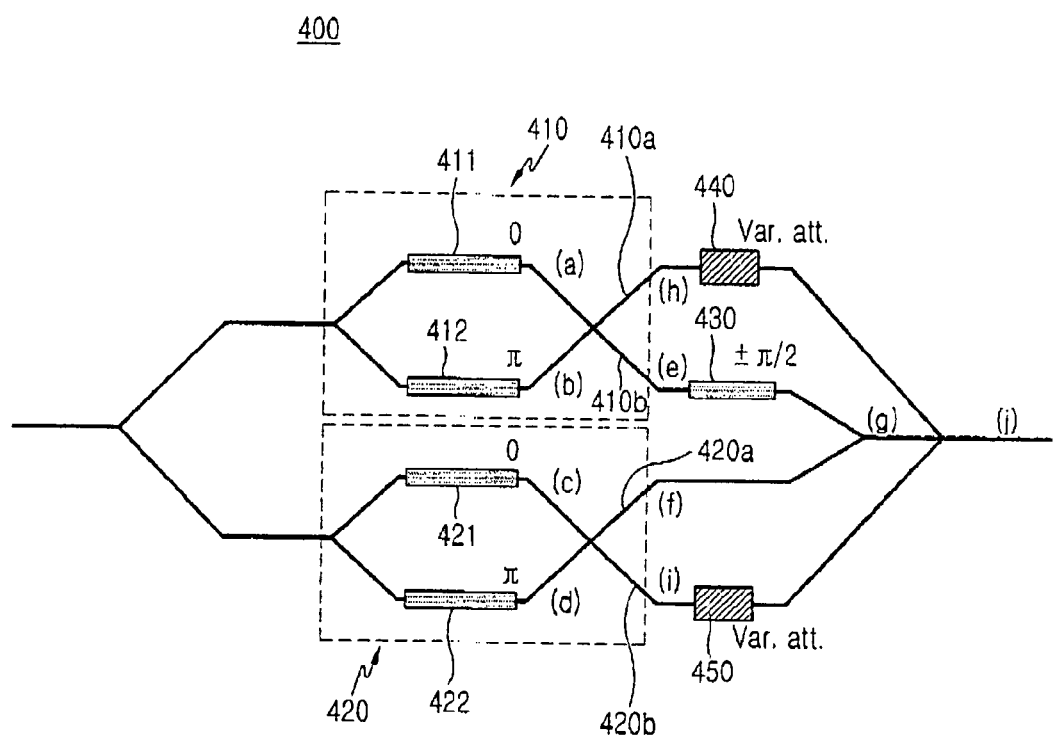
FIG. 8 illustrates a single side band modulation device according to a third embodiment of the present invention.

FIG. 8 illustrates a single side band modulation device 400 according to a third embodiment of the present invention. The single side band modulation device 400 includes a first Mach Zehnder interferometer 410 having a first output arm 410b and a second output arm 410a, a second Mach Zehnder interferometer 420 having a third output arm 420a and a fourth output arm 420b, a first port g connected with the first output arm 410b and the third output arm 420a, and a second port j extending from the first port g and connected with the second output arm 410a and the fourth output arm 420b.

The first Mach Zehnder interferometer 410 outputs to the first output arm 410b the third signal obtained by mixing the first signal and the second signal, and outputs to the second output arm 410a the fourth signal, obtained by phase-shifting one of the first signal and the second signal and mixing the phase-shifted signal with the other of the first and second signals.

The second Mach Zehnder interferometer 420 outputs to the third output arm 420a the fifth signal obtained by mixing the first signal and the second signal, and outputs to the fourth output arm 420b the sixth signal, obtained by phase-shifting one of the first and second signals and mixing the phase-shifted signal with the other of the first and second signals.

The single side band modulation device 400 may further include variable optical attenuators 440, 450 respectively positioned on the second output arm 410a and the fourth output arm 420b, or merely one of the optical variable attenuators 440, 450 positioned on its respective output arm. The optical variable attenuators 440, 450 can adjust the magnitude of the carrier frequency of the fourth signal or the sixth signal. The modulation device 400 preferably further includes a phase modulator 430 positioned on the first output arm 410b to modulate the phase of the third signal by $\pi/2$ or $-\pi/2$.

The single side band modulation device according to the present invention includes Mach Zehnder interferometers having at least two output arms, thereby generating an upper side band signal or a lower side band signal having a carrier frequency.

According to the present invention, it is possible to prevent the generation of an unwanted single side band that may occur in conventional modulators for generating a single side band signal including a carrier frequency. When necessary, the magnitude of the carrier frequency included in the single side band signal can be adjusted.

While the invention has been shown and described with reference to preferred embodiments thereof, it will be understood by those skilled in the art that various changes in form and details may be made therein without departing from the spirit and scope of the invention.

What is claimed is:

1. A single side band modulation device comprising:
   a first Mach Zehnder interferometer including first and second output arms;
   a second Mach Zehnder interferometer including first and second output arms;
   a first terminal directly coupled to the first output arms of the first and second Mach Zehnder interferometers; and
   a second terminal directly coupled to the second output arms of the first and second Mach Zehnder interferometers,
   wherein the first and second terminals are directly coupled with one another.

2. The device of claim 1, wherein each of the at least four output arms has a respective terminal, the respective terminals collectively constituting said first and second terminals which are coupled with one another.

3. The device of claim 2, wherein coupling by which said respective terminals are coupled with one another optically combines signals outputted by said respective terminals.

4. The device of claim 1, wherein a coupling by which said first and second terminals optically combines signals outputted by said first and second terminals.

5. The device of claim 1, wherein a single one of said arms includes a phase modulator.

6. The device of claim 5, wherein an arm of said at least first and second output arms of the first Mach Zehnder interferometer includes a variable attenuator, and wherein an arm of said at least first and second output arms of the second Mach Zehnder interferometer includes a variable attenuator.

7. The device of claim 1, wherein an arm of said at least first and second output arms of said first Mach Zehnder interferometer includes a phase modulator and only one of said at least first and second output arms of said second Mach Zehnder interferometer includes a phase modulator.

8. The device of claim 1, wherein said at least first and second output arms of said first Mach Zehnder interferometer constitute two arms, and wherein said at least first and second output arms of said second Mach Zehnder interferometer constitute two arms.

9. A single side band modulation device comprising:
   a first Mach Zehnder interferometer including at least two output arms;
   a second Mach Zehnder interferometer including at least two output arms; and
   a plurality of signal-combining ports,
   wherein ones one of the at least two output arms from each of the first and second Mach Zehnder interferometers being coupled and input into a first of the plural signal-combining ports, and another one of said at least two output arms from each of the first and second Mach Zehnder interferometers being coupled, along with output of said first of the ports, and input into a second of the plural signal-combining ports.

10. The device of claim 9, wherein said plurality of signal-combining ports constitutes two signal-combining ports.

11. The device of claim 10, further comprising an output terminal that transmits output directly from said second of the ports.

12. The device of claim 9, wherein only one of the output arms coupled and input to the first of the ports includes a phase modulator.

13. The device of claim 12, wherein each output arms coupled and input to said second of the ports does not include a phase modulator.

14. The device of claim 13, wherein each of said output arms is coupled to a respective phase modulator contained within a corresponding one of the first and second Mach Zehnder interferometers.

15. The device of claim 9, wherein said output arms coupled and input into a first of the ports and said output arms coupled and input into a second of the ports constitute two output arms each.

16. A single side band modulation device for modulating a first signal and a second signal into an upper side band signal or a lower side band signal to output the modulated signal, the single side band modulation device comprising:
   a first Mach Zehnder interferometer for outputting to a first output arm a third signal obtained by mixing the first signal and the second signals, and for outputting to a second output arm a fourth signal obtained by phase-shifting one of the first signal and the second signal and mixing the phase-shifted signal with the other of the first and second signals;
   a second Mach Zehnder interferometer for outputting to a third arm a fifth signal obtained by mixing the first signal and the second signals, and for outputting to a fourth output arm a sixth signal obtained by phase-shifting one of the first and second signals and mixing the phase-shifted signal with the other of the first and second signals;
   a first port connected with the first output arm and the third output arm; and
   a second port extending from the first port and connected with the second output arm and the fourth output arm.

17. The single side band modulation device of claim 16, further comprising a phase modulator positioned on the first output arm to shift the phase of the third signal by $\pi/2$ or $-\pi/2$.

18. The single side band modulation device of claim 16, wherein each of the first Mach Zehnder interferometer and the second Mach Zehnder interferometer includes at least two phase modulators for modulating the phases of the first signal and the second signal to cause the first signal and the second signal to have a phase difference of $\pi$.

19. The single side band modulation device of claim 16, further comprising phase modulators positioned on the second output arm and the fourth output arm to minimize a phase difference between the fourth signal and the sixth signal.

20. The single side band modulation device of claim 16, further comprising variable attenuators positioned on the second output arm and the fourth output arm to adjust magnitudes of the fourth and sixth signals.

* * * * *